Nov. 5, 1929.    Q. V. DISTEFANO    1,734,245
APPARATUS FOR GENERATING ELECTRICITY
Filed July 7, 1927    2 Sheets-Sheet 2
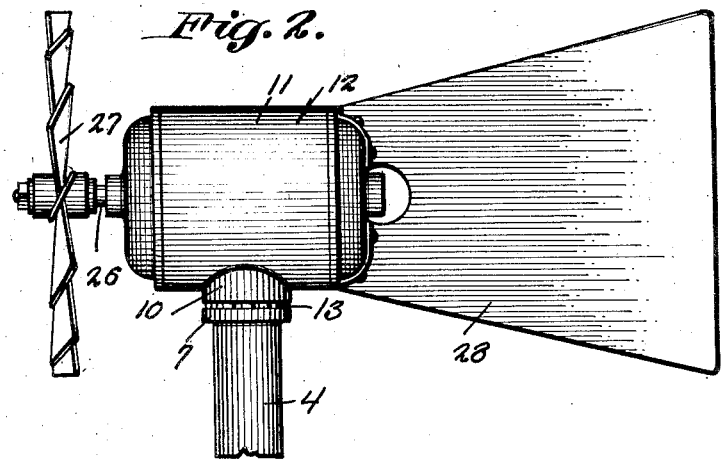
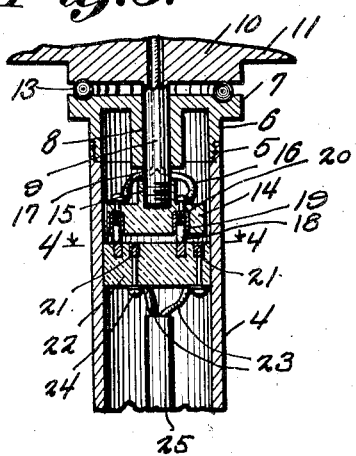
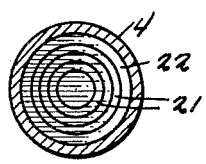
Quirino V. Distefano  INVENTOR.
Witnesses
BY Richard B. Owen
ATTORNEYS.

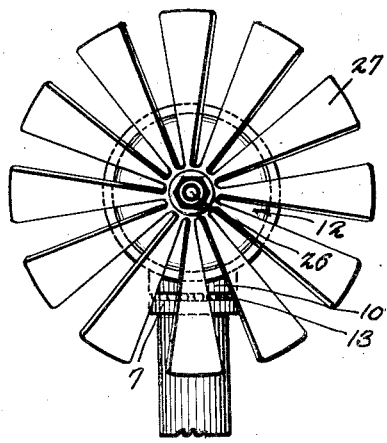
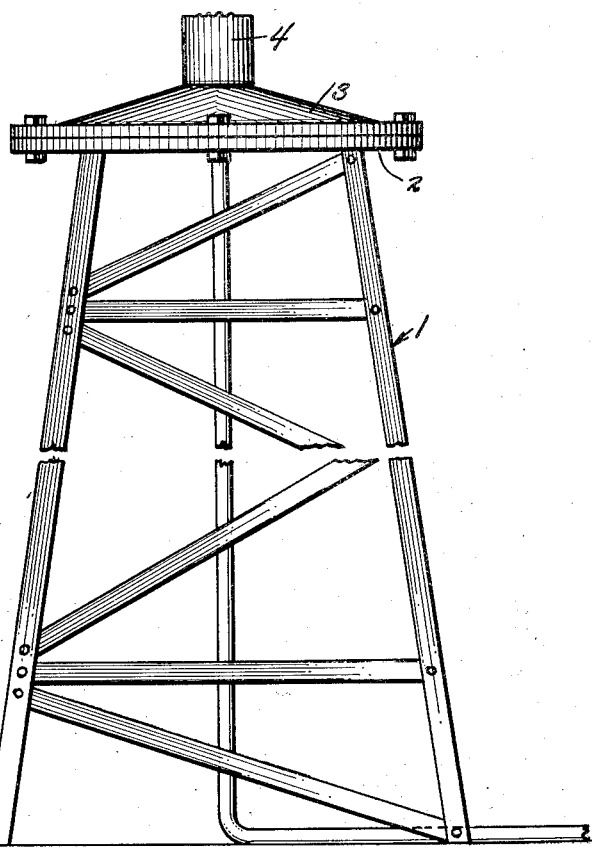

Patented Nov. 5, 1929

1,734,245

UNITED STATES PATENT OFFICE

QUIRINO V. DISTEFANO, OF WATERBURY, CONNECTICUT

APPARATUS FOR GENERATING ELECTRICITY

Application filed July 7, 1927. Serial No. 204,009.

This invention relates to power generators and has as its general object to provide means whereby electricity may be generated, for lighting or power purposes, at a very small cost.

More specifically the invention has as its object to provide novel means whereby the force of wind may be utilized in the generation of electricity, and the invention contemplates an apparatus for this purpose which will be simple and durable in construction and highly efficient in its operation.

The invention also has as one of its objects to provide means whereby the generated current may be supplied directly to a lighting or power circuit or to a battery for the purpose of charging the same, either as desired, means being likewise provided for the supply of current from the battery to the said lighting or power circuit.

While the accompanying drawings and the description which is to follow, constitute a disclosure of the preferred embodiment of the invention, it will be understood that various changes may be made within the scope of what is claimed.

In the accompanying drawings:

Fig. 1 is a view in elevation of the generating apparatus embodying the invention;

Fig. 2 is a detail side elevation of the upper portion of the apparatus, illustrating the generator and the windmill for operating the same;

Fig. 3 is a detail vertical diametric sectional view through the upper portion of the support for the generator and illustrating the manner in which current is conducted from the generator to the remainder of the electrical circuit of the apparatus regardless of the direction from which the wind is blowing;

Fig. 4 is a horizontal sectional view taken substantially on the line 4—4 of Figure 3 looking in the direction indicated by the arrows.

In the drawings the numeral 1 indicates a tower or other supporting structure which may be mounted in any convenient manner either upon the roof of a dwelling or other building or upon the ground, and this structure supports, at its upper end, a platform 2 to which is secured the base 3 of a tubular column 4 upon which the generator of the apparatus is mounted in a manner which will now be described.

At its upper end, the column 4 is interiorly threaded as indicated by the numeral 5, and a cap 6 is threaded exteriorly at its lower end and fitted into the upper end of the column, the cap being closed at its upper end as clearly shown in Figure 3 and provided preferably with an outstanding circumferential flange 7. The cap is provided centrally of its closed top, and interiorly, with a depending cylindrical bearing sleeve 8 which rotatably accommodates a tubular extension 9 projecting axially from the base 10 of the casing 11 of a generator which is indicated by the numeral 12, the generator being of the direct current type. The upper side of the closed top of the cap 6 and the under side of the base 10 of the generator casing are provided with bearing races, and bearing balls 13 are arranged in the races and serve to support the generator casing for free rotary movement upon the upper end of the column 4. The generator is held in assembled relation with the cap 6 through the medium of a head 14 of insulating material which is provided centrally, at its upper side, with an upstanding socket 15 which is interiorly threaded to accommodate the threaded lower end of the tubular extension 9 of the base of the generator casing, the upper end of the socket 15 abutting against the lower end of the bearing sleeve 8 of the cap 6 as clearly shown in Figure 3 so as to prevent upward displacement of the extension 9 in the said sleeve 8. Conductor wires 16 are led from the output terminals of the direct current generator 12 and through the tubular extension 9 of the base of the generator casing and into the column 4 through openings 17 provided in the upper end of the socket 15, these openings being preferably located at diametrically opposite points. The conductor wires 16 are connected to contact brushes 18 mounted in suitable bushings 19 in the under side of the head 14, and springs 20 are arranged within the bushings and hold the contact brushes in engagement with contact rings 21 which are seated in the upper side of a circular block 22 of insulating material which is fixed within the upper portion of the column 4, in any suitable manner. Conductor wires 23 are led from binding elements 24 which are electrically connected with the rings 21, and through a pipe 25 which extends downwardly, concentrically within the column 4 and through the lower end of the column and downwardly through the tower structure 1 and to a switch mechanism for controlling the electrical circuits of the apparatus as will presently be described. It will be understood at this point that the contacts 18 are at all times in contact with the contact rings 21, regardless of the rotary movement of the generator casing 11. The shaft of the generator is indicated by the numeral 26, and extends at one end beyond the corresponding end of the casing 11 and has fixed upon it a plurality of vanes 27 which are disposed in the same manner as the vanes of a wind mill, so that the force of wind will act upon the blades to impart rotary motion to the shaft 26 of the generator and thus effect generation of electricity. The generator, at its other end, supports the rudder or positioning vane 28 which is acted upon by the wind currents to automatically adjust the generator 12 to present the vanes 27 to the wind.

It will be observed by reference to Figure 3 of the drawings that the rings 21 are concentrically arranged with respect to each other and to the axis of the head 22, and that the brushes 18 are spaced at different distances from the axis of the head 14 and at diametrically opposite sides of the axis, and maintain contact with the respective rings 21, in all positions of rotative adjustment of the generator 12, so that there is an uninterrupted supply of current through the wires 23 so long as the wind wheel of the apparatus is in operation.

Having thus described the invention, what I claim is:

1. In apparatus of the class described, a support comprising an upright hollow column, a cap upon the upper end of the column, a generator including a casing supported for rotative movement upon the said cap, the casing having an extension rotatably fitting in the cap, the generator including the usual shaft, a rudder vane upon the casing of the generator for effecting rotative movement of the generator under the influence of air currents, vanes radiating from the generator shaft, a head supported by the extension of the generator casing within the said column, spaced contacts carried by the head, conductor wires leading from the generator and through the extension and connected with the contacts, a second head arranged within and fixed with respect to the said column below the first mentioned head, concentric contacts carried by the last mentioned head and continuously engaged by respective ones of the first mentioned contacts, and conductor wires leading from the last mentioned contacts through the column.

2. In apparatus of the class described, a support comprising an upright hollow column, a cap upon the upper end of the column, a generator including a casing supported for rotative movement upon the said cap, the casing having an extension rotatably fitting in the cap, the generator including the usual shaft, a rudder vane upon the casing of the generator for effecting rotative movement of the generator under the influence of air currents, vanes radiating from the generator shaft, a head supported by the extension of the generator casing within the said column, spaced contacts carried by the head, conductor wires leading from the generator and through the extension and connected with the contacts, a second head arranged within and fixed with respect to the said column below the first mentioned head concentric contacts carried by the last mentioned head and continuously engaged by respective ones of the first mentioned contacts, conductor wires leading from the last mentioned contacts through the column, the said cap being removable from the column, and means upon the first mentioned head for engagement with the cap to restrain the extension of the said generator casing against upward displacement from the cap.

In testimony whereof I affix my signature.

QUIRINO V. DISTEFANO.